Patented July 23, 1940

2,208,980

UNITED STATES PATENT OFFICE 2,208,980

STENCIL SHEET

Shinjiro Horii, Kanda-ku, Tokyo, Japan

No Drawing. Application June 15, 1939, Serial No. 279,369. In Japan May 1, 1939

4 Claims. (Cl. 41—38.6)

This invention relates to improvements in stencil sheets for use in duplicating manuscript or typewritten documents, drawings and the like and particularly stencil sheets of the type consisting of a sheet of fibrous material provided with a normally impervious coating in which characters may be formed by the pressure of a hand stylus or by the impact of the type of a writing machine.

The present invention is based upon the discovery that initial polymers of diamines and dicarboxylic acids, emulsified and softened by emulsifiers and tempering or softening agents and dispersed in water or other dispersing medium, constitute a highly efficient coating for stencil sheets, possessing flexibility and durability.

The initial polymers may be prepared by the condensation of diamines, such as pentamethylenediamine or hexamethylenediamine, with dicarboxylic acids, such as adipinic acid or sebacic acid, on application of heat at 100–220° C. in the presence of solvents, such as toluol or phenol, in atmosphere of nitrogen. The condensation must be stopped before the reaction products become infusible and insoluble. The resultant initial polyamides are soft and flexible, and can be easily emulsified with suitable softening agents.

In carrying out the invention, the coating material is prepared by emulsifying and softening the initial polymers described above with emulsifying agents, such as soaps, Turkey-red oil, sulphate salts of higher fatty alcohols, triethanolamine, lecithins or the like, and tempering agents, such as ethylene glycol, glycerine, sorbitol, fatty oils, fats, waxes, heavy-mineral oil, naphthenic-acid esters or a mixture containing two or more of these, and dispersing the mixture into water or other suitable dispersing medium, such as alcohols, solvent naphtha, cyclohexanol, butyl acetate, ethers of glycols or the like. Then the prepared coating material may be applied to the fibrous base, such as Japanese Yoshino paper, in the usual manner.

The proportions of the ingredients of the coating material may vary according to several circumstances. The following is an example:

| | Parts by weight |
|---|---|
| Polymerized products | 20 |
| Turkey-red oil | 10 |
| Castor oil | 20 |
| Water | 100 |
| Cyclohexanol | 20 |

What I claim is:

1. A stencil sheet consisting of a base of fibrous material coated with a coating material comprising the initial condensation products of diamines with dicarboxylic acids, and including emulsifiers and tempering agents.

2. A stencil sheet consisting of a base of fibrous material coated with a coating material comprising the initial condensation product of pentamethylenediamine with sebacic acid, and including emulsifiers and tempering agents.

3. A stencil sheet consisting of a base of fibrous material coated with a coating material comprising the initial polymers of the condensation products of diamines with dicarboxylic acids, and including emulsifiers and tempering agents.

4. A stencil sheet consisting of a base of fibrous material coated with a coating material comprising the initial polymers of the condensation products of the group of diamines consisting of pentamethylenediamine and hexamethylenediamine with the group of dicarboxylic acids consisting of adipenic acid and sebacic acid, said material further including emulsifiers and tempering agents.

SHINJIRO HORII.